United States Patent
Nieuwveen et al.

(10) Patent No.: US 11,879,773 B2
(45) Date of Patent: Jan. 23, 2024

(54) PYRANOMETER AND METHOD OF ASSEMBLING A PYRANOMETER

(71) Applicant: OTT HydroMet B.V., Delft (NL)

(72) Inventors: Robertus Dennis Nieuwveen, Leiden (NL); Ilja Xander Staupe, Barendrecht (NL); Ramon Commereuc, Sommelsdijk (NL)

(73) Assignee: OTT HydroMet B.V., Delft (NL)

( * ) Notice: Subject to any disclaimer, the term of this patent is extended or adjusted under 35 U.S.C. 154(b) by 99 days.

(21) Appl. No.: 17/561,706

(22) Filed: Dec. 23, 2021

(65) Prior Publication Data
US 2022/0196467 A1    Jun. 23, 2022

(30) Foreign Application Priority Data

Dec. 23, 2020  (EP) .................................... 20216771

(51) Int. Cl.
*G01J 1/42*    (2006.01)
*G01J 1/02*    (2006.01)

(52) U.S. Cl.
CPC .......... *G01J 1/0252* (2013.01); *G01J 1/0271* (2013.01); *G01J 1/42* (2013.01); *G01J 2001/4285* (2013.01)

(58) Field of Classification Search
CPC .......... G01J 1/0252; G01J 1/0271; G01J 1/42; G01J 2001/4285
See application file for complete search history.

(56) References Cited

U.S. PATENT DOCUMENTS

| | | | | |
|---|---|---|---|---|
| 5,331,168 A | * | 7/1994 | Beaubien | G01J 1/02 250/365 |
| 10,533,892 B2 | * | 1/2020 | Brown | G01J 5/10 |
| 2019/0145907 A1 | * | 5/2019 | Van Mechelen | G01J 1/02 356/239.1 |
| 2019/0186988 A1 | * | 6/2019 | Hasegawa | G01J 1/06 |

FOREIGN PATENT DOCUMENTS

| | | |
|---|---|---|
| CN | 211347107 U | 8/2020 |
| EP | 3480570 A1 | 5/2019 |

* cited by examiner

*Primary Examiner* — David P Porta
*Assistant Examiner* — Fani Polyzos Boosalis
(74) *Attorney, Agent, or Firm* — Ference & Associates LLC

(57) ABSTRACT

One embodiment provides a pyranometer, including: a pyranometer housing; and at least one radiation sensor; wherein the at least one radiation sensor is electrically isolated from the pyranometer housing and thermally coupled to the pyranometer housing by at least one supporting element, wherein the supporting element is connected to the pyranometer housing and is configured to support the at least one radiation sensor. Other aspects are described and claimed.

20 Claims, 4 Drawing Sheets

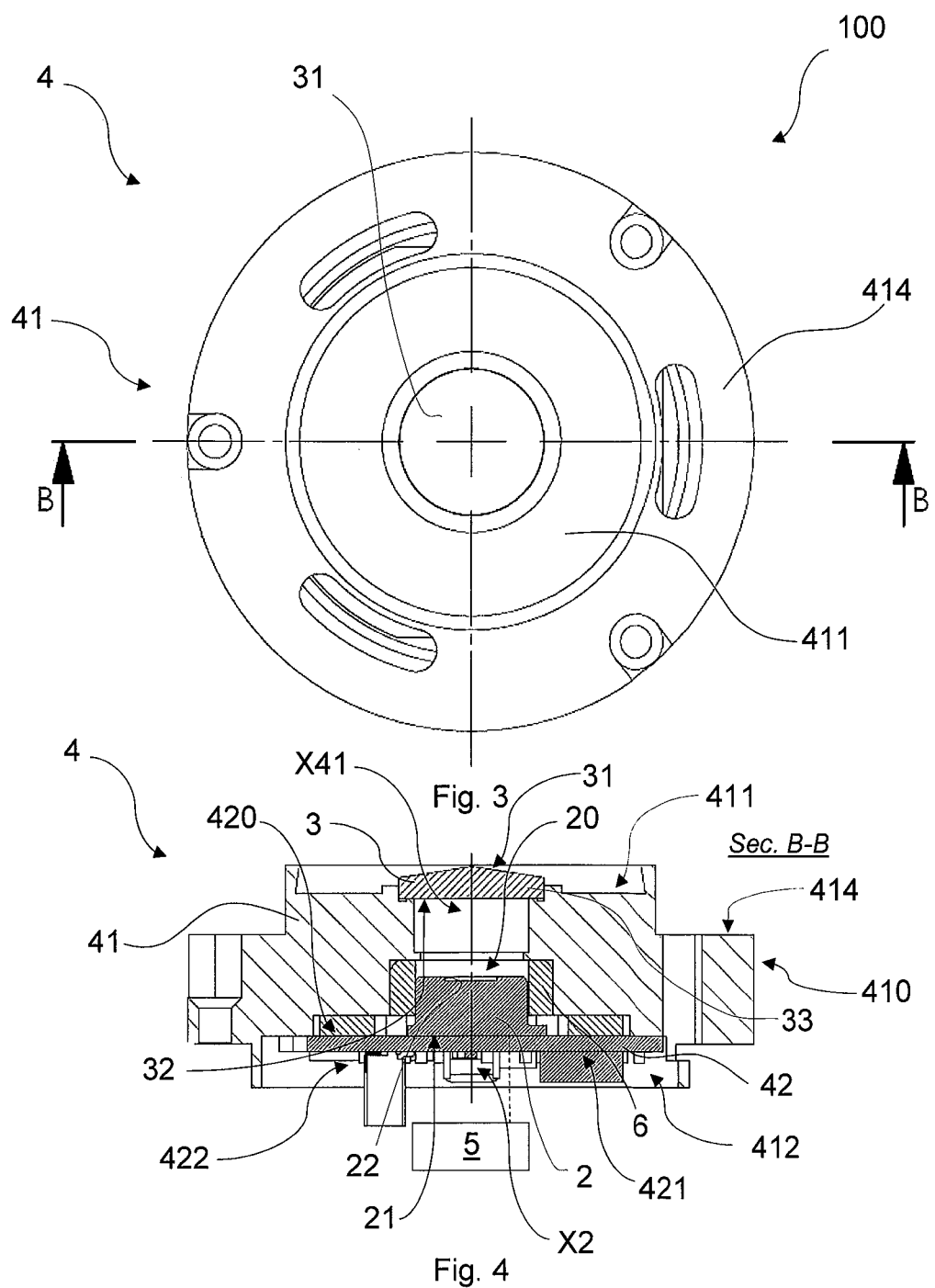

PYRANOMETER AND METHOD OF ASSEMBLING A PYRANOMETER

The present application claims priority to European Patent Application No. EP20216771, which was filed on Dec. 23, 2020, the contents of which are hereby incorporated by reference.

TECHNICAL FIELD

The present invention relates to a pyranometer and to a method of assembling a pyranometer.

BACKGROUND

A pyranometer is a measuring instrument that detects the radiation amount (e.g. the solar irradiance amount) incident on a surface.

According to the working principle for the measurement of irradiance, pyranometers can be grouped in two different categories, that is thermopile-based sensor pyranometers and silicon semiconductor-based pyranometers.

As to the thermopile-based sensor pyranometers, the irradiance is measured by a sensor based on thermopiles and designed to measure a substantially broad band of the radiation flux density, from about a 180° field of view angle. The thermopile-based sensor is arranged below a transparent dome, particularly a dome made of glass, the latter limiting the spectral response from about 190 to about 4000 nanometers, particularly from about 300 to about 2800 nanometers, while substantially preserving about the 180° field of view. At the same time, the glass dome has the function of protecting the thermopile-based sensor from the external environment.

Pyranometers can be used in conjunction with other systems, among others solar simulators, photovoltaic systems, and meteorological stations. In these systems, the radiation measured by the pyranometer is used for determining other parameters and/or performances of the system, for example the photovoltaic module effective power. Therefore, the measurement accuracy of a pyranometer is one outmost aspect of this measuring instrument. Particularly, the measurement accuracy of the pyranometer is even more one outmost aspect in climate applications where changes of parts of a percent over years are recorded.

During use, the dome of a pyranometer may be covered by a layer of dew or frost, especially during the early hours of a day, just before the sunrising. A layer of dew or frost may potentially prevent a large amount of radiation to reach the thermopile-based sensor. Additionally, a layer of frost or dew may also reflect a substantial amount of the radiation in a direction opposite to the thermopile-based sensor. Consequently, in the presence of dew or frost, the irradiance (e.g. solar irradiance) measured by the pyranometer may not correspond to the effective irradiance that may be measured in absence of a dew/frost layer. Thus, in order to accurately measure the incident radiation, the pyranometer response should not be affected by frost or dew.

In order to prevent the formation of a dew or frost layer, known pyranometers are heated. Specifically, known pyranometers are usually heated and simultaneously ventilated so as to defrost the dome, thereby resulting in a more precise measuring of the irradiance (e.g. solar irradiance). The heating is particularly performed by an electric fan arranged close to a heating element. The electric fan is configured to diffuse a warm air flow over the pyranometer body, and particularly in a cavity above the dome. The warm air flow diffused by the fan defrosts the glass dome.

The use of a heating/ventilation unit may result in a temperature offset in the pyranometer. In other words, the temperature measured by the sensor may be greater than the effective temperature that may be measured in absence of the additional heating. Consequently, the temperature offset resulting from the additional heating can substantially reduce the measurement accuracy. Additionally, a direct heating of the radiation sensor (thermopile-based sensor) is also not performed because of a thermal offset signal that may be produced.

Accordingly, there is the need to a heated pyranometer, wherein layers of dew or frost that may cover the dome outer surface can be efficiently removed, while not affecting the measurement accuracy of pyranometers.

SUMMARY

It is an object of the present invention to provide a pyranometer for measuring the irradiance with a high accuracy. Particularly, it is an object of the present invention to provide a heated pyranometer whose measurement accuracy is not affected by weather conditions, for example by the formation of dew or frost layer.

The achievement of this object in accordance with the invention is set out in the independent claims. Further developments of the invention are the subject matter of the dependent claims.

According to an aspect, there is provided a pyranometer comprising: a pyranometer housing; and at least one radiation sensor; wherein the at least one radiation sensor is electrically isolated from the pyranometer housing and thermally coupled to the pyranometer housing by at least one supporting element, wherein the supporting element is connected to the pyranometer housing and is configured to support the at least one radiation sensor.

Particularly, the radiation measured by the radiation sensor may include any type of radiation in the electromagnetic spectrum, including radiation in the ultraviolet (UV), visible, and infrared spectrum (IR), and particularly it may include solar radiation.

Specifically, the pyranometer can be directly heated without affecting the measurement accuracy. In other words, the pyranometer housing and dome can be heated without adversely influencing the irradiance measurement performed by the radiation sensor(s). More specifically, the pyranometer is significantly insensitive to adverse meteorological conditions such as dew and/or frost.

Particularly, the supporting element comprises, or at least partially is made, of a ceramic material to enable electrical isolation.

Specifically, a ceramic material enhances the thermal connection between the radiation sensor and the pyranometer housing, while electrically isolating the radiation sensor from the housing. Additionally, a ceramic material makes the pyranometer substantially insensitive to electrical interference.

Particularly, the supporting element comprises, or is a printed circuit board, particularly wherein the printed circuit board is thermally coupled to the at least one radiation sensor. Specifically, the electrical and/or electronic component(s) of the printed circuit board can be thermally coupled to the at least one radiation sensor through the same printed circuit board (supporting element). Typically, if the radiation sensor is a micro-thermopile, an onboard thermistor (temperature sensor) is present on the printed circuit board.

Accordingly, the thermal coupling between the onboard thermistor of the printed circuit board and the radiation sensor (thermopile-based sensor) can be improved.

Particularly, the at least one radiation sensor may comprise a thermopile-based sensor.

Further particularly, the pyranometer may further comprise at least one diffusor configured to diffuse light external to the pyranometer on a receiving surface of the at least one radiation sensor.

Particularly, the pyranometer may further comprise a radiation sensor housing, wherein the at least one radiation sensor is included into the radiation sensor housing and wherein the supporting element is configured to support the radiation sensor housing.

Particularly, the pyranometer may further comprise a dome, wherein the dome is connected to the pyranometer housing such that the dome and the pyranometer housing are thermally coupled.

Particularly, the pyranometer may further comprise a centering element connected to the at least one radiation sensor and to the pyranometer housing, wherein the centering element is configured to center the at least one radiation sensor with respect to a longitudinal axis of the dome of the pyranometer, and/or with respect to a longitudinal axis of the at least one diffusor.

Further particularly, the centering element may be configured to electrically isolate the at least one radiation sensor from the pyranometer housing.

Particularly, the centering element comprises, or is at least partially made of, a resilient material, particularly a polymeric material.

Further particularly, the centering element comprises a supporting portion configured to enclose the at least one radiation sensor, and a base portion configured to contact a surface of the supporting element.

Further particularly, the pyranometer may further comprise at least one heating element, wherein the heating element is arranged to heat the pyranometer housing, particularly by contact.

Specifically, a heating element arranged to heat (by contact) the pyranometer housing allows to defrost the pyranometer dome, that is making the pyranometer dome free of ice, dew and/or frost.

Particularly, the at least one heating element comprises at least one thermal conductive foil arranged in an inner cavity of the pyranometer housing.

Specifically, at least one thermal conductive foil optimizes the thermal connection between the radiation sensor and the pyranometer housing, while electrically isolating the radiation sensor from the latter.

According to a particular embodiment, a method of assembling a pyranometer is provided. The method comprises: providing a pyranometer housing; and mounting at least one radiation sensor to the pyranometer housing such that the at least one radiation sensor is electrically isolated from the pyranometer housing and thermally coupled to the pyranometer housing by means of at least one supporting element configured to support the at least one radiation sensor.

Particularly, the supporting element comprises, or at least partially is made, of a ceramic material and/or wherein the supporting element comprises or is a printed circuit board, particularly wherein the printed circuit board is thermally coupled to the at least one radiation sensor.

SUMMARY OF THE DRAWINGS

These and other objects, features and advantages of the present invention will become more apparent upon a reading of the following detailed description and accompanying drawings. It should be understood that even though embodiments are separately described, single features thereof may be combined to additional embodiments.

FIG. 3, is a plan view of the pyranometer according to FIG. 2;

FIG. 4, is a cross-section view of the pyranometer shown in FIG. 3;

PARTICULAR EMBODIMENTS

With reference to the above figures, the pyranometer according to the present disclosure is indicated in its entirety with the reference number 100.

Figure 1:
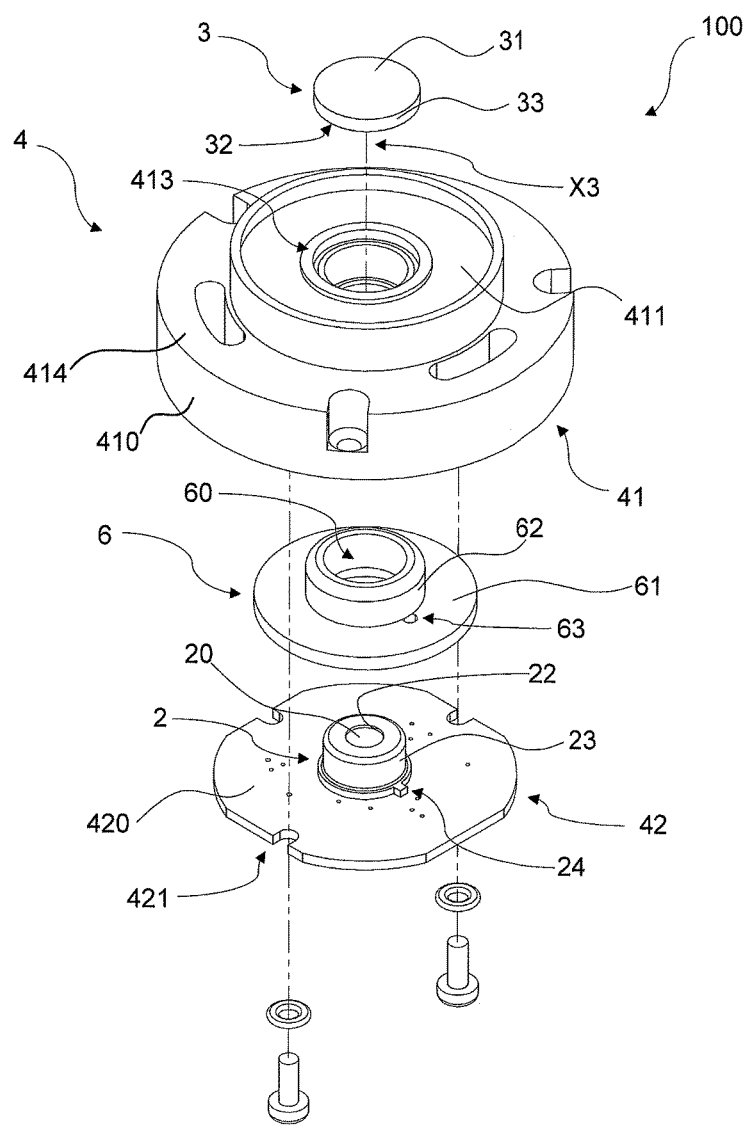
FIG. 1, is an axonometric exploded view of the pyranometer according to an aspect of the present invention.

With reference to FIG. 1, the pyranometer according to the present disclosure is indicated in its entirety with the reference number 100. The pyranometer 100 comprises a dome 1. The dome 1 may be an outer dome of the pyranometer 100. In other words, when mounted on the pyranometer 100, the dome 1 may form the outermost dome 1 of the pyranometer 100. If the dome 1 is an outer transparent dome 1 of the pyranometer 100, an outer surface 11 of the dome 1 substantially faces an environment 13 external to the pyranometer 100. In contrast, an inner surface 12 of the dome 1 substantially encloses a cavity 10. Particularly, the cavity 10 is an air cavity underneath the dome 1. Thus, the inner surface 12 of the dome 1 substantially faces the cavity 10. The cavity 10 substantially corresponds to the space underneath the inner surface 12 of the dome 1. Particularly, the cavity 10 has a shape that is substantially complementary to the shape of the inner surface 12 of the dome 1 that encloses the cavity 10. The cavity 10 may have a substantially hemispherical shape and includes a bottom opening having a substantially circular shape. The dome 1 may comprise an edge 14. The edge 14 may be a perimetric edge substantially forming the rim of the dome 1. The edge 14 may have a substantially annular shaped surface. Particularly, a difference between the external radius, that is the radius of the outer surface 11, and the internal radius, that is the radius of the inner surface 12, substantially corresponds the thickness of the dome 1.

The dome 1 is at least partially transparent to a radiation (e.g. solar light). Particularly, the radiation may be solar radiation. Particularly, the dome 1 is configured to limit the spectral response from about 190 to about 4000 nanometers (nm), specifically from about 300 to about 2800 nanometers (nm), while particularly substantially preserving the 180° field of view. The transparency of the dome 1 may be particularly such that at least about 60%, more particularly at least about 70% of the incident radiation (e.g. solar radiation or light) in the relevant spectral range may pass therethrough. In other words, the dome 1 is configured to allow at least a portion of the radiation spectrum to be transmitted from the external environment 13, through the outer surface 11, through the material forming the dome 1 and through the inner surface 12, into the cavity 10. In the cavity 10, the radiation can be measured as will be described in more details hereafter.

The dome 1 may be made of any suitable at least partially transparent material that allows the transmission of a radiation (particularly solar radiation or light) therethrough. Particularly, the dome 1 may be made of any material having such physical/chemical characteristics so as to physically protect the measuring surface of the pyranometer 100 yet at the same time being transparent to (most) of the light (at least partially transparent for a spectrum of radiation (e.g. solar radiation) the pyranometer 100 is intended to detect). For example, the dome 1 may be made of glass, quartz or sapphire. Alternatively, the dome 1 may be made of a transparent thermoplastic polymeric material, i.e. poly(methyl methacrylate) (PMMA) also known as acrylic, acrylic glass, or plexiglass.

As shown in FIGS. 1 and 4, the pyranometer 100 comprises at least one radiation sensor 2. Particularly, the pyranometer 100 may comprise one, or more radiation sensors 2. The radiation sensor 2 is a measuring sensor configured to measure the radiation (particularly the solar radiation) impinging the pyranometer 100. Particularly, the radiation measured by the at least one radiation sensor 2 may include any type of radiation in the electromagnetic spectrum, including radiation in the ultraviolet (UV), visible, and infrared spectrum (IR), and more particularly it may include solar radiation.

Particularly, the radiation sensor 2 comprises a receiving surface 20. Particularly, the radiation sensor 2 is arranged such that the radiation external to the pyranometer 100 impinges on the receiving surface 20. Particularly, the radiation impinging the pyranometer 100 is at least partially transmitted through the dome 1 and/or diffused on or toward the receiving surface 20 of the radiation sensor 2, by means of at least one diffusor 3. The diffusor 3 is specifically arranged to diffuse the radiation passing through the dome 1, on the receiving surface 20 of the radiation sensor 2. Particularly, the radiation sensor 2 and the diffusor 3 may be stacked one on top of the other, particularly with a distance or air gap therebetween. As shown in FIG. 4, the radiation sensor 2 comprises a second opposite (bottom) surface 21.

The radiation sensor 2 may be or comprise a thermopile-based sensor. The thermopile-based sensor may be based on thermopiles particularly suitable to measure the broad band of the radiation flux density specifically from a substantially 180° field of view angle. A thermopile specifically is an electronic device that converts thermal energy into electrical energy and comprises several thermocouples connected in series or in parallel. The thermopile works on the principle of the thermoelectric effect of generating a voltage when its dissimilar metals or thermo-couples are exposed to a temperature difference. Thermocouples operate by measuring the temperature differential from their junction point to the point in which the thermocouple output voltage is measured. Once a closed circuit is made up of more than one metal and there is a difference in temperature between junctions and points of transition from one metal to another, a current is produced as if generated by a difference of potential between the junctions being at different temperatures. In other words, the pyranometer 100 of the present disclosure particularly may be a thermopile pyranometer (also referred to as thermo-electric pyranometer).

Specifically, a thermopile pyranometer particularly detects light of about 300 to about 2800 nm with a largely flat spectral sensitivity. Specifically, if the radiation sensor 2 is a thermopile-based sensor, the receiving surface 20 substantially corresponds to, or comprises, a black coating which absorbs (particularly all) radiation (e.g. solar radiation or modified solar radiation modified e.g. in its spectral composition by the optical elements in front of it such as the dome 1 and/or the diffusor 3) impinging thereon. The active (hot) junctions of the thermocouples are located beneath (or in correspondence with or adjacent to) the black coating surface and are heated by the radiation absorbed from the black coating. The passive (cold) junctions of the thermocouples are (particularly fully) protected from radiation and in thermal contact with a pyranometer housing 4, which particularly serves as a heat-sink. Particularly, the passive (cold) junctions of the thermocouples are in contact with a radiation sensor housing 23 that may be in thermal contact with the pyranometer housing, so as to substantially dissipate the heat to or through the pyranometer housing. This advantageously reduces or prevents any alteration from yellowing or decay when measuring the temperature in the shade, thus impairing the measure of the irradiance by the pyranometer 100.

The radiation sensor 2 may be located in a radiation sensor housing 23. The radiation sensor housing 23 may be provided with a window 22 that allows to expose the receiving surface 20 of the radiation sensor 2. The radiation sensor housing 23 may have a cavity configured to integrally at least partly contain the radiation sensor 2. In other words, the radiation sensor 2 may be included into the radiation sensor housing 23.

The housing 23 specifically may be a TO (transistor outline) housing: particularly, the housing 23 of the radiation sensor 2 may comprise, or be made of, a metal. More particularly, the metal material of the housing 23 may be a thermal and electrical conductor.

The window 22 of the housing 23 may be arranged to substantially face, but not in direct contact with, the receiving surface 20 of the radiation sensor 2 on its bottom side. Particularly, a gap may be present between the receiving surface 20 and the window 22 in order to prevent thermal leakage which may degrade the sensor performance. The window 22 of the housing 23 may be arranged to substantially face, but not in direct contact with, a second (bottom) surface 32 of the diffusor 3 on its upper side. Particularly, a gap may be present between the second (bottom) surface 32 of the diffusor 3 and the window 22. In other words, the window 22 of the housing 23 may be substantially arranged between, but not in contact with, the second (bottom) surface 32 of the diffusor 3, and the receiving surface 20 of the radiation sensor 2.

The window 22 of the housing 23 is at least partially transparent to the radiation (light). Particularly, the window 22 of the housing 23 may have a transparency such that at least about 60%, more particularly at least about 70% of the incident radiation (e.g. solar radiation or light) in the relevant spectral range may pass therethrough. If the radiation sensor 2 is located into the housing 23, the second surface 21 of the radiation sensor 2 corresponds to a bottom surface of the housing 23. The housing 23 of the radiation sensor 2 may comprise, or be made of, thermally conductive material, for example metallic material. More particularly, the metal of the housing 23 may be Aluminum, Aluminum alloy, steel or steel alloy.

As shown in FIGS. 1 to 4, the pyranometer 100 comprises the at least one diffusor 3. Particularly, the pyranometer 100 may comprise one or more diffusors 3. The diffusor 3 is configured to diffuse radiation (light) external to the pyranometer 100, and passing through the dome 1, toward the receiving surface 20 of the radiation sensor 2. Accordingly, the radiation impinging the receiving surface 20 the radiation sensor 2 (particularly of the thermopile-based sensor 2) can be measured by the radiation sensor 2.

The diffusor 3 is an optical element that has an incident first or top surface 31 substantially facing the cavity 10 of the dome 1, particularly when the diffusor 3 is mounted on the pyranometer 100. In other words, the diffusor 3 is arranged such that the incident surface 31 substantially faces the inner surface 12 of the dome 1, in the cavity 10. Particularly, the diffusor 3 may be located in a through-opening provided in the pyranometer housing 4, particularly in a through opening 413 provided in an upper surface 411 of a first portion 41 of the pyranometer housing 4, such that the incident surface 31 of the diffusor 3 substantially faces the inner surface 12 of the dome 1.

The diffusor 3 comprises a second (bottom) surface 32 that is substantially opposite to the incident first or top surface 31 and at least one side surface 33. The diffusor 3 is arranged such that the second surface 32 is substantially opposite to the incident surface 31 and substantially faces the receiving surface 20 of the radiation sensor 2. The incident surface 31 may be a flat circularly shaped surface, a conically shaped surface, a convex surface, a concave surface, or an inverted conical surface.

Particularly, the diffusor 3 may be axisymmetric, that is symmetric about a longitudinal axis X3 of the diffusor 3. In other words, the diffusor 3 may be a rotationally symmetric body having a longitudinal axis X3. For example, the diffusor 3 may have a substantially cylindrically shaped side surface 33 and/or comprise a conically shaped incident first or top surface 31.

As shown in FIG. 4, the diffusor 3 may be arranged such that the second surface 32 substantially faces toward the receiving surface 20 of the radiation sensor 2 (particularly of the thermopile-based sensor 2), whereas the incident surface 31 substantially faces towards the inner surface 12 of the dome 1.

Accordingly, the radiation or light (e.g. solar radiation) external to the dome 1 enters the cavity 10 through the dome 1. In the cavity 10, the radiation or light impinges the incident surface 31 of the diffusor 3 and it is at least partly transmitted through the diffusor 3 and the second surface 32, towards the receiving surface 20 of the radiation sensor 2. The radiation or light (e.g. solar radiation) reaching the radiation sensor 2 can be thus measured by the latter.

The diffusor 3 may comprise or be made of any material that allows a light incident thereon to be diffused and transmitted through the diffusor 3. For example, the diffusor 3 may comprise, or be made, of at least partially porous material, such as quartz, particularly bubble quartz.

As shown in FIG. 4, the pyranometer 100 may comprise at least one control unit 5. The control unit 5 may be operatively connected to the radiation sensor 2. The control unit 5 may be a controller, particularly a micro controller. The control unit 5 may be located in a pyranometer housing 4.

The pyranometer housing 4 may comprise the first portion 41. Particularly, the first portion 41 may be configured to, at least partially, enclose the radiation sensor 2.

As shown in FIG. 4, the first portion 41 may comprise a cavity 412. Particularly, the cavity 412 may be configured to, at least partially, contain the radiation sensor 2. More particularly, the cavity 412 may be configured to integrally contain the radiation sensor 2. In other words, the cavity 412 may be dimensioned so as to at least partially, or integrally, enclose the radiation sensor 2.

Specifically, the cavity 412 may have a cylindrical shape. As shown in FIG. 1, the cavity 412 may be surrounded by a perimetral wall 410. The perimetral wall 410 may be part of the same first portion 41. The perimetral wall 410 may have a cylindrical shape, that is it may correspond to a cylindrical outer surface of the first portion 41. The cavity 412 may be further delimited by the first (upper) surface 411 of the first portion 41 and by a second (upper) surface 414. The first surface 411 and the second surface 414 may be seamlessly coupled to the perimetral wall 410. Particularly, the first surface 411 may have a circular shape. Additionally, the first surface 411 may include a through opening 413 in connection with the cavity 412. The second surface 414 may be configured as a flange portion of the first portion 41 of the pyranometer housing 4. That is, the first surface 411 and the second surface 414 substantially may lie on parallel planes.

Figure 5:
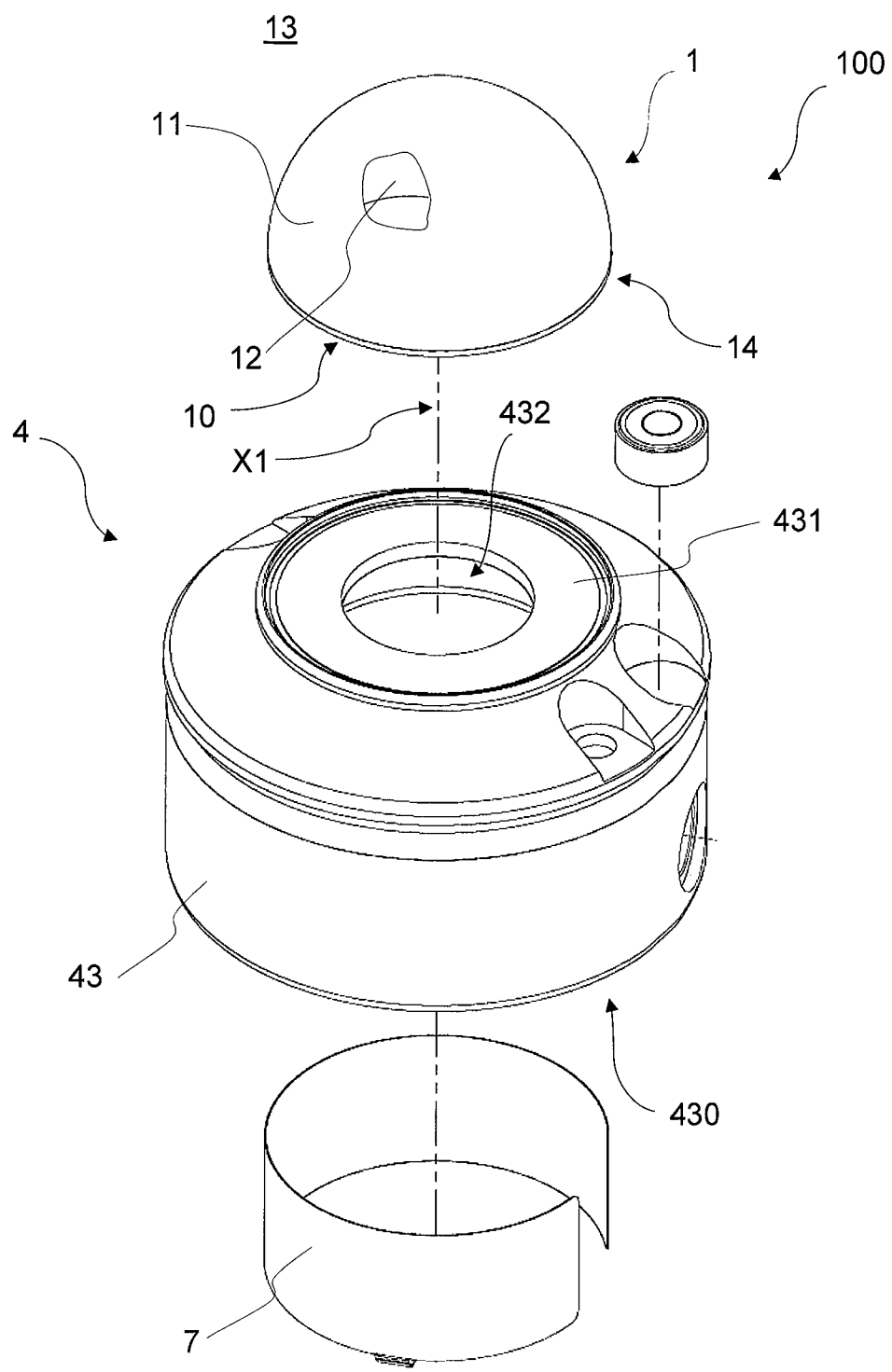
FIG. 5, is an axonometric exploded view of the pyranometer according to an aspect of the present invention.

As shown in FIG. 5, the pyranometer housing 4 may comprise a second (outer) portion 43. The second portion 43 may have a substantially cylindrical shape. The second portion 43 may comprise at least one through opening 432 arranged on an upper surface 431 of the second portion 43.

Particularly, the second portion 43 may be configured to substantially, integrally, enclose the first portion 41. Particularly, the second portion 43 may have a cavity 430 that is configured to integrally contain the first portion 41 of the pyranometer housing 4 therewithin. Specifically, the second portion 43 may be an outer carter of the pyranometer 100 configured to protect the first portion 41, as well as the radiation sensor 2 and/or a control unit 5 from the environment external to the pyranometer 100. The second portion 43 may be made of, or may comprise, a metallic material. Specifically, the metallic material may be an Aluminum alloy, aluminum, steel or brass.

The first portion 41 may be removably coupled to the second portion 43. Particularly, the first portion 41 may be arranged to directly contact the second portion 43. Specifically, by arranging the first portion 41 to (particularly directly) contact the second portion 43 a thermal coupling between the first portion 41 and the second portion 43 can be obtained. More particularly, when the first portion 41 may be coupled to the second portion 43, the first (upper) surface 411 and/or the second (upper) surface 414 of the first portion 41 may be in direct contact with an inner surface of the second portion 43, e.g. an inner surface of the cavity 430.

Particularly, the first surface 411 of the first portion 41 may be configured to be at least partially located in the through opening 432 arranged on an upper surface 431 of the second portion 43, when the first portion 41 is coupled to the second portion 43. Accordingly, the diffusor 3 that is supported by the first portion 41 may be also located in the through opening 432. The first surface 411 of the first portion 41 may contact an inner bottom side of the upper surface 431 of the second portion 43. The second (upper) surface 414 of the first portion 41 may also contact the inner bottom side of the upper surface 431 of the second portion 43 and/or the inner surface of the second portion 43, e.g. an inner surface of the cavity 430.

As shown in FIG. 5, the dome 1 may be coupled to the second portion 43 of the pyranometer housing 4, particularly to the upper surface 431 of the second portion 43 of the pyranometer housing 4. The dome 1 may be arranged to particularly directly contact the upper surface 431 of the second portion 43 of the pyranometer housing 4. Accordingly, the dome 1 may be thermally coupled to the second portion 43 of the pyranometer housing 4.

Figure 2:
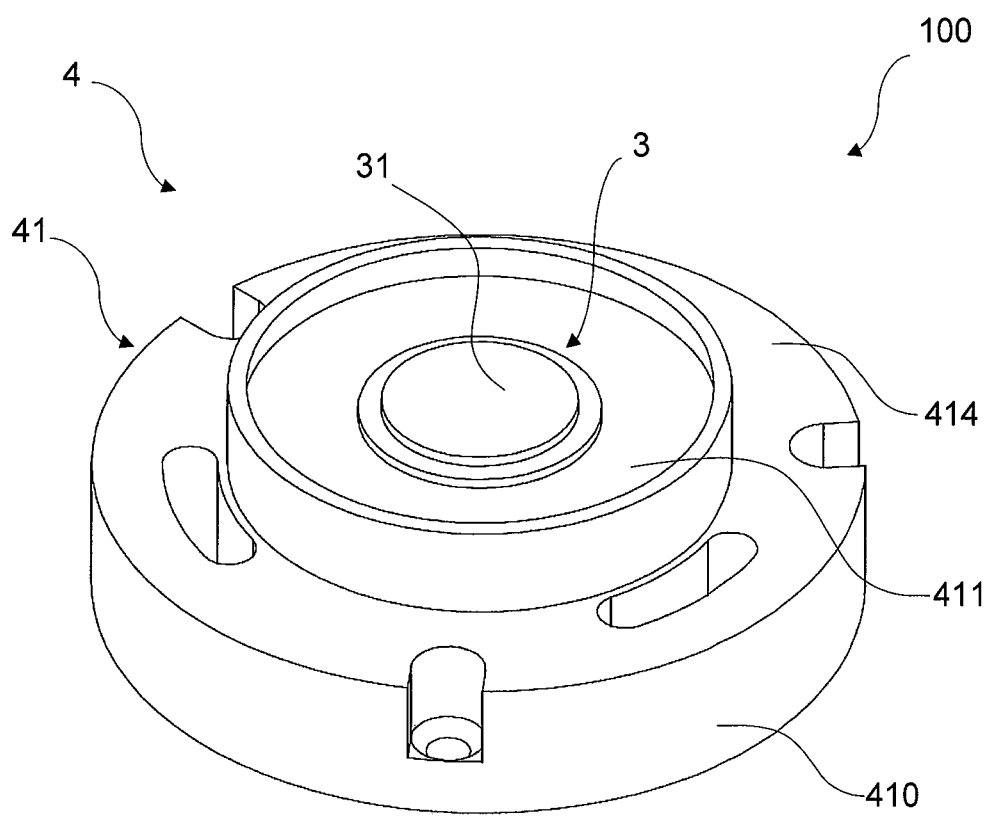
FIG. 2, is an axonometric assembled view of a portion of the pyranometer illustrated in FIG. 1.

As shown in FIG. 5, when the dome 1 is coupled to the upper surface 431 of the second portion 43 of the pyranometer housing 4, the through opening 413 of the first portion 41 is also in connection with (arranged below) the cavity 10 of the dome 1. Particularly, the diffusor 3 may be arranged in the through opening 413 of the first portion 41, as shown in FIGS. 2 to 4.

In summary, as shown in FIG. 5, the dome 1 is connected to the pyranometer housing 4, particularly to the upper surface 431 of the second portion 43 of the pyranometer housing 4. Particularly, the dome 1 is configured to contact the pyranometer housing 4, particularly the surface 431 of the second portion 43. By means of this arrangement, the dome 1 and the pyranometer housing 4 are thermally coupled. Particularly, the dome 1 is (specifically directly) thermally coupled to the second portion 43 and (specifically indirectly) to the first portion 41 of the pyranometer housing 4. That is, the dome 1 may be thermally coupled to the first portion 41 by means of the second portion 43. As a result, the dome 1 may be directly heated by thermal contact, particularly by means of the pyranometer housing 4 being heated, as described below.

The first portion 41 may comprise, or be made of, a thermally conductive material. Specifically, the thermally conductive material may be a metallic material. For example, the first portion 41 may be made of a Aluminum, aluminum alloy, steel or steel alloy.

The pyranometer housing 4 comprises at least one supporting element 42. The supporting element 42 may substantially be a plate or plate-like. Particularly, the supporting element 42 substantially may be a plate having a circular shape.

The supporting element 42 may include a first (upper) surface 420 and a second (bottom) surface 421 that is opposite to the first surface 420. The supporting element 42 is coupled to the pyranometer housing 4, particularly to the first portion 41 of the pyranometer housing 4.

Specifically, the supporting element 42 is removably coupled to the pyranometer housing 4, particularly to the first portion 41. For example, the supporting element 42 may be removably coupled to the first portion 41 by a mechanical connection, i.e. one or more screws, rivets and/or clamps, and/or by adhesive.

Particularly, the supporting element 42 may be configured to at least partially, or integrally, close a bottom opening of the cavity 412, when assembled to the first portion 41 of the pyranometer housing 4. In other words, when the supporting element 42 is coupled to the first portion 41, the cavity 412 becomes a substantially closed cavity and it integrally contains the radiation sensor 2 therewithin. Therefore, the cavity 412 is substantially delimited by the supporting element 42 on its bottom side, by the perimetral wall 410 on its lateral perimetral sides, and by the first surface 411 on its upper side. The cavity 412 may be in communication with the cavity 10 of the dome 1 by means of the through opening 413 provided on the first surface 411.

As shown in FIG. 4, the radiation sensor 2 is supported by the supporting element 42 on the pyranometer housing 4. Particularly, the second surface 21 of the radiation sensor 2 (or the bottom surface of the radiation sensor housing 23 of the radiation sensor 2) at least partially contacts the first surface 420 of the supporting element 42. Particularly, the radiation sensor 2 and the first surface 420 of the supporting element 42 may be in direct contact, or indirect contact to each other The second surface 21 of the radiation sensor 2 may be directly connected to the first surface 420 of the supporting element 42. More particularly, the second surface 21 of the radiation sensor 2 may be coupled to the first surface 420 of the supporting element 42 by adhesive.

The supporting element 42 is configured to electrically isolate the radiation sensor 2 from the pyranometer housing 4, particularly from the first portion 41 of the pyranometer housing 4. Simultaneously, the supporting element 42 is configured to thermally coupled the radiation sensor 2 to the pyranometer housing 4, particularly to the first portion 41 of the pyranometer housing 4. In other words, the radiation sensor 2 is connected to the pyranometer housing 4 by means of a supporting element 42. The supporting element 42 is specifically configured as electrically isolating element, that is the supporting element 42 does not allow any direct passage of electrical current between the pyranometer housing 4 and the radiation sensor 2. At the same time, the supporting element 42 is specifically configured as thermally coupling element, that is the pyranometer housing 4 (particularly the first portion 41) is thermally coupled to the radiation sensor 2 (or to the housing 25 of the radiation sensor 2) by means of the supporting element 42. Accordingly, a heat flow may be exchanged between the pyranometer housing 4, particularly the first portion 41 of the pyranometer housing 4, and the radiation sensor 2 by means of the supporting element 42.

In summary, the radiation sensor 2 is electrically isolated from the pyranometer housing 4 and simultaneously thermally coupled to the pyranometer housing 4, particularly to the first portion 41 by at least one supporting element 42, wherein the supporting element 42 is connected to the pyranometer housing 4 and it is configured to support the radiation sensor 2. Accordingly, the supporting element 42 is configured to support the radiation sensor 2 (or the radiation sensor housing 23 containing the radiation sensor 2) on the pyranometer housing 4.

Particularly, the supporting element 42 may comprise, or it may be at least partially made of any suitable material having electrically isolation properties and simultaneously having thermal conduction properties. Particularly, the supporting element 42 may comprise, or it may be at least partially made of, any suitable metallic or nonmetallic electrically isolating and thermally conducting material.

Specifically, the supporting element 42 may comprise, or it may be at least partially made of, a ceramic material. For example, the ceramic material may be aluminum nitride. Specifically, the supporting element 42 may have at thickness of about 1 mm. The supporting element 42 may have a heat conductivity equal to, or greater than, about 170 W/(mK).

According to an aspect, the supporting element 42 comprises, or is a printed circuit board (PCB). The printed circuit board may be thermally coupled to the radiation sensor 2 through the same supporting element 42.

Particularly, the supporting element 42 may mechanically support and electrically connect to each other one or more electrical or electronic component(s) 422. The one or more electrical or electronic component(s) may be arranged on the second (bottom) surface 421 of the supporting element 42, that is the electrical or electronic component(s) may be arranged on the surface opposite to the first surface 420 of the supporting element 42 where the radiation sensor 2 is supported.

Specifically, the supporting element 42 may comprise on the second surface 421 one or more conductive track(s), pad(s) and other features etched from one or more sheet layers of conductive material (i.e. copper) that is laminated onto and/or between sheet layers of a non-conductive substrate. The one or more electrical or electronic component(s) of the printed circuit board may be operatively connected to the radiation sensor 2.

At least one temperature sensor, particularly a thermistor, may be located on the second surface 421 of the supporting element 42. The temperature sensor may be in direct contact with the supporting element 42 so as to be thermally coupled to the radiation sensor 2 that is located on the first surface 420 of the supporting element 42.

As shown in FIGS. 1 and 4, the pyranometer 100 may comprise a centering element 6. The centering element 6 may be configured to substantially, at least partially, enclose the radiation sensor 2. Particularly, if the radiation sensor 2 is enclosed into a radiation sensor housing 23, the centering element 6 may be configured to substantially, at least partially, enclose the radiation sensor housing 23.

Particularly, the centering element 6 may include a through opening 60 provided in supporting portion 62 of the centering element 6. The through opening 60 may have a shape that is substantially complementary to the external shape of the radiation sensor 2 (or of the external shape of the radiation sensor housing 23), so as to enclose the radiation sensor 2 within the through opening 60 of the supporting portion 62. For example, the through opening 60 may be circularly shaped, particularly if the radiation sensor 2 has a substantially cylindrical shape.

The centering element 6 may comprise a base portion 61. Particularly, the base portion 61 may substantially be shaped as a flange. The base portion 61 may be configured to directly, or indirectly, contact the supporting element 42, particularly the first surface 420 of the supporting element 42.

The centering element 6 may be connected to the radiation sensor 2 and to the pyranometer housing 4. Particularly, the base portion 61 of the centering element 6 may be removably coupled to the supporting element 42 of the pyranometer housing 4, and/or the supporting portion 62 of the centering element 6 may be removably coupled to the radiation sensor 2.

Particularly, the radiation sensor 2 may be tightly fit in the through opening 60 of the supporting portion 62 of the centering element 6, while the base portion 61 of the centering element 6 may be configured to directly contact the first surface of the supporting element 42. Particularly, the base portion 61 of the centering element 6 may be coupled to the first surface 420 of the supporting element 42 by adhesive.

Specifically, the centering element 6 may be configured to substantially center the radiation sensor 2 or the first portion 41 of the housing 4 with respect to a longitudinal axis X1 of the dome 1 of the pyranometer 100, and/or with respect to a longitudinal axis X3 of the diffusor 3. In other words, the centering element 6 is configured to align a longitudinal axis X2 of the radiation sensor 2 (or a longitudinal axis X41 of the first portion 41 of the housing 4), with the longitudinal axis X3 of the diffusor 3, and/or with a longitudinal axis X1 of the dome 1.

The centering element 6 may be provided with a centering groove 63. The centering groove 63 may be configured to enclose a corresponding centering protrusion 24, the latter provided on the radiation sensor 2. Particularly, the centering protrusion 24 may protrude, substantially in a radial direction, by the radiation sensor 2 (or by the housing 23) and it may be dimensioned so as to match with or correspond to the centering groove 63. In other words, the centering protrusion 24 may be integrally enclosed in the centering groove 23. Specifically, the matching between the centering groove 63 and the centering protrusion 24 provides a guidance to the alignment, and subsequent coupling, between the centering element 6 and the radiation sensor 2.

The centering element 6 may be configured to electrically isolate the radiation sensor 2 from the pyranometer housing 4. In other words, the centering element 6 may be specifically configured as electrically isolating element, that is the centering element 6 does not allow any direct passage of electrical current between the pyranometer housing 4 and the radiation sensor 2.

The centering element 6 may comprise, or it may be at least partially made of any suitable material having electrically isolation properties. Particularly, the centering element 6 may comprise, or it may be at least partially made of, any suitable metallic or nonmetallic electrically isolating material.

More particularly, the centering element 6 may comprise, or may be at least partially made of, a resilient material. Further particularly, the centering element 6 may be made of a thermoplastic, or thermosetting, polymeric material.

As shown in FIG. 5, the pyranometer 100 may comprise at least one heating element 7. The heating element 7 may be arranged to heat the pyranometer housing 4, particularly the first portion 41 and/or the second portion 43 of the pyranometer housing 4.

Particularly, the heating element 7 may be arranged to at least partly contact the perimetral wall 410 of the first portion 41 of the pyranometer housing 4. Accordingly, the first portion 41 of the pyranometer housing 4 may be heated by contact by means of the heating element 7.

Alternatively, or additionally, the heating element 7 may be also arranged to at least partly contact an inner surface of the cavity 430 of the second portion 43 of the pyranometer housing 4. Accordingly, the second portion 43 of the pyranometer housing 4 may be heated by contact by means of the heating element 7.

The heating element 7 may comprise at least one thermal conductive foil. The thermal conductive foil may be made of polyamide. Particularly, the heating element 7 may be arranged in and/or coupled to an inner cavity of the pyranometer housing 4, particularly the an inner cavity 430 of the second portion 43 of the pyranometer housing 4, and/or on the perimetral wall 410 of the first portion 41 of the pyranometer housing 4.

Due to the thermal contact between the heating element 7 and the first portion 41 and/or the second portion 43 of the pyranometer housing 4, the first portion 41 and/or the second portion 43 may be heated by contact by the heating element 7. The dome 1 can be also heated by the heating element 7 as a result of the thermal coupling between the second portion 43 of the pyranometer housing 4 and the dome 1. The radiation sensor 2 is also heated by the heating element 7 by means of the supporting element 42, the latter being thermally coupled to the first portion 41 of the pyranometer housing 4. In other words, the radiation sensor 2 may be also heated through the supporting element 42. The latter thermally couples the radiation sensor 2 to the pyranometer housing 4, e.g. the first portion 41, that is (particularly directly) heated, by contact, by the heating element 7.

Additionally or alternatively, the dome 1 may be heated by the heating element 7, particularly as a result of the thermal connection (thermal contact) between the dome 1 and the pyranometer housing 4, e.g. the second portion 43.

The heating element 7 may be or comprise at least one heating foil and/or flexible heater. The heating foil may be a heating foil comprising, or being made of, a polymeric material. For example, the heating foil may comprise, or it may be made of Polyester or Polyamide. The flexible heater may be a chemically etched, screen printed and/or wire wound heater which can be flexed or bent or deformed to substantially conform to the contours of the surface of the pyranometer housing 4 which is to be heated. The flexible heater may be or comprise a silicone rubber heater (etched and/or wire wound), a Polyimide/Kapton® Film heater, a carbon printed heater, and/or a transparent heater.

Specifically, the heating foil may be arranged to at least partly, specifically substantially completely wrap or cover the perimetral wall 410 of the first portion 41 of the pyranometer housing 4. The heating element 7 may be controlled by the control unit 5.

Particularly, the pyranometer 100 may further comprise at least one thermal conductive foil (not illustrated). The thermal conductive foil may be arranged between the radiation sensor 2 and the pyranometer housing 4.

According to an aspect, a method of assembling a pyranometer 100 is disclosed. The method of assembling the pyranometer 100 comprising a step of providing a pyranometer housing 4. The method further comprises a step of mounting a radiation sensor 2 to the pyranometer housing 4 such that the radiation sensor 2 is electrically isolated from the pyranometer housing 4 and thermally coupled to the pyranometer housing 4 by means of at least one supporting element 42 configured to support the radiation sensor 2.

The method of assembling the pyranometer 100 may further comprise a step of mounting a diffusor 3, particularly mounting a diffusor 3 on the pyranometer housing 4 (specifically on the first portion 41 of the pyranometer housing 4), wherein the diffusor 3 is arranged to diffuse light external to the pyranometer 100 on the receiving surface 20 of the radiation sensor 2.

The method of assembling the pyranometer 100 may further comprise a step of locating the radiation sensor 2 into the radiation sensor housing 23, and mounting the radiation sensor housing 23 on the supporting element 42.

The method of assembling the pyranometer 100 may further comprise a step of mounting a dome 1 on the pyranometer housing 4 such that the dome 1 and the pyranometer housing 4 are thermally coupled.

The method of assembling the pyranometer 100 may further comprise a step of mounting a centering element 6 on the radiation sensor 2, and mounting an assembly formed by the radiation sensor 2, the supporting element 42 and the centering element 6 on the pyranometer housing 4, specifically in the cavity 412 of the first portion 41 of the pyranometer housing 4 such that the longitudinal axis X2 of the radiation sensor 2 is substantially aligned with a longitudinal axis of the dome X1 and/or with a longitudinal axis X3 of the diffusor 3, and/or with a longitudinal axis X41 of the first portion 41 of the pyranometer housing 4.

The method of assembling the pyranometer 100 may further comprise a step of mounting the at least one heating element 7, particularly arranging the at least one heating element 7 to contact the pyranometer housing 4 so as to heat the pyranometer housing 4 by contact. Particularly, the method of assembling the pyranometer 100 may further comprise a step of mounting the at least one heating element 7 to the pyranometer housing 4, particularly inside the cavity of the pyranometer housing 4. Specifically, the dome 1 may be heated by being thermally coupled to the pyranometer housing 4 and/or the radiation sensor 2 may be heated by being mounted on or to the supporting element 42 which may be thermally coupled to the pyranometer housing 4.

REFERENCE NUMBERS

1 . . . dome
2 . . . radiation sensor(s)
3 . . . diffusor(s)
4 . . . pyranometer housing
5 . . . control unit
6 . . . centering element
7 . . . heating element
10 . . . cavity
11 . . . outer surface of the dome
12 . . . inner surface of the dome
13 . . . environment external to the pyranometer
14 . . . edge of the dome
20 . . . receiving surface of the radiation sensor
21 . . . second (bottom) surface of the radiation sensor
22 . . . window of the housing
23 . . . housing of the radiation sensor
24 . . . centering protrusion
31 . . . first incident or top surface of the diffusor
32 . . . second (bottom) surface of the diffusor
33 . . . side surface of the diffusor
41 . . . first portion of the pyranometer housing
42 . . . supporting element
43 . . . second portion of the pyranometer housing
60 . . . through opening
61 . . . base portion of the centering element
62 . . . supporting portion of the centering element
63 . . . centering groove
410 . . . perimetral wall
411 . . . first (upper) surface
412 . . . cavity
413 . . . through opening
414 . . . second (upper) surface of the first portion of the pyranometer housing
420 . . . first (upper) surface of the supporting element
421 . . . second (bottom) surface of the supporting element
422 . . . electrical or electronic components
430 . . . cavity of the second portion of the pyranometer housing
431 . . . upper surface of the second portion of the pyranometer housing
432 . . . through opening 432 of the second portion
100 . . . pyranometer
X1 . . . longitudinal axis of the dome
X2 . . . longitudinal axis of the radiation sensor
X3 . . . longitudinal axis of the diffusor
X41 . . . longitudinal axis of the first portion

The invention claimed is:

1. A pyranometer, comprising:
a pyranometer housing; and
at least one radiation sensor;
wherein the at least one radiation sensor is electrically isolated from the pyranometer housing and thermally coupled to the pyranometer housing by at least one supporting element, wherein the supporting element is connected to the pyranometer housing and is configured to support the at least one radiation sensor, wherein the supporting element comprises a material to enhance the thermal coupling between the at least one radiation sensor and the pyranometer housing.

2. The pyranometer according to claim 1, wherein the supporting element comprises, or at least partially is made, of a ceramic material to enable electrical isolation.

3. The pyranometer according to claim 2, wherein the supporting element comprises or is a printed circuit board, particularly wherein the printed circuit board is thermally coupled to the at least one radiation sensor.

4. The pyranometer according to claim 1, wherein the supporting element comprises or is a printed circuit board, particularly wherein the printed circuit board is thermally coupled to the at least one radiation sensor.

5. The pyranometer according to claim 1, wherein the at least one radiation sensor comprises a thermopile-based sensor.

6. The pyranometer according to claim 1, further comprising at least one diffusor configured to diffuse light external to the pyranometer on a receiving surface of the at least one radiation sensor.

7. The pyranometer according to claim 6, further comprising a dome, wherein the dome is connected to the pyranometer housing such that the dome and the pyranometer housing are thermally coupled.

8. The pyranometer according to claim 1, further comprising a radiation sensor housing, wherein the at least one radiation sensor is included into the radiation sensor housing and wherein the supporting element is configured to support the radiation sensor housing.

9. The pyranometer according to claim 1, further comprising a dome, wherein the dome is connected to the pyranometer housing such that the dome and the pyranometer housing are thermally coupled.

10. The pyranometer according to claim 1, further comprising a centering element connected to the at least one radiation sensor and to the pyranometer housing, wherein the centering element is configured to center the at least one radiation sensor with respect to a longitudinal axis of the dome of the pyranometer and/or with respect to a longitudinal axis of the at least one diffusor.

11. The pyranometer according to claim 10, wherein the centering element is configured to electrically isolate the at least one radiation sensor from the pyranometer housing.

12. The pyranometer according to claim 11, wherein the centering element comprises, or is at least partially made of, a resilient material.

13. The pyranometer according to claim 12, wherein the resilient material is a polymeric material.

14. The pyranometer according to claim 10, wherein the centering element comprises, or is at least partially made of, a resilient material.

15. The pyranometer according to claim 14, wherein the resilient material is a polymeric material.

16. The pyranometer according to claim 10, wherein the centering element comprises a supporting portion configured to enclose the at least one radiation sensor, and a base portion configured to contact a surface of the supporting element.

17. The pyranometer according to claim 1, further comprising at least one heating element, wherein the heating element is arranged to heat the pyranometer housing, particularly by contact.

18. The pyranometer according to claim 17, wherein the at least one heating element comprises at least one thermal conductive foil arranged in an inner cavity of the pyranometer housing.

19. A method of assembling a pyranometer, comprising:
providing a pyranometer housing; and
mounting at least one radiation sensor to the pyranometer housing such that the at least one radiation sensor is electrically isolated from the pyranometer housing and thermally coupled to the pyranometer housing by means of at least one supporting element configured to support the at least one radiation sensor, wherein the supporting element comprises a material to enhance the thermal coupling between the at least one radiation sensor and the pyranometer housing.

20. The method according to claim 19, wherein the supporting element comprises, or at least partially is made, of a ceramic material and/or wherein the supporting element comprises or is a printed circuit board, particularly wherein the printed circuit board is thermally coupled to the at least one radiation sensor.

* * * * *